(12) United States Patent
Adelman et al.

(10) Patent No.: US 12,037,714 B2
(45) Date of Patent: **\*Jul. 16, 2024**

(54) PROCESS FOR MAKING POLYACRYLONITRILE FIBERS

(71) Applicant: NUTRITION & BIOSCIENCES USA 4, INC., Rochester, NY (US)

(72) Inventors: Douglas J. Adelman, Wilmington, DE (US); Natnael Behabtu, Wilmington, DE (US); Alicia C. Briegel, Wilmington, DE (US); Ross S. Johnson, Wilmington, DE (US); Christian Peter Lenges, Wilmington, DE (US); Kathleen Opper, Wilmington, DE (US); Andreas Jorgen Wego, Dusseldorf (DE); Christian Herbert, Dormagen (DE)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,982

(22) Filed: Feb. 11, 2022

(65) Prior Publication Data

US 2022/0267932 A1    Aug. 25, 2022

Related U.S. Application Data

(63) Continuation of application No. 16/461,455, filed as application No. PCT/US2017/062524 on Nov. 20, 2017, now Pat. No. 11,248,314.

(60) Provisional application No. 62/425,323, filed on Nov. 22, 2016.

(51) Int. Cl.
| | | |
|---|---|---|
| *C07H 13/04* | (2006.01) | |
| *C08B 37/00* | (2006.01) | |
| *C08L 5/00* | (2006.01) | |
| *C08L 33/20* | (2006.01) | |
| *D01D 1/02* | (2006.01) | |
| *D01D 5/06* | (2006.01) | |
| *D01F 2/00* | (2006.01) | |
| *D01F 6/54* | (2006.01) | |
| *D01F 9/00* | (2006.01) | |

(52) U.S. Cl.
CPC ............ *D01F 6/54* (2013.01); *C08B 37/0009* (2013.01); *C08L 5/00* (2013.01); *C08L 33/20* (2013.01); *D01D 5/06* (2013.01); *D01F 9/00* (2013.01); *C08J 2305/00* (2013.01)

(58) Field of Classification Search
CPC .. C07H 13/04; C08B 37/0009; C08J 2305/00; C08L 5/00; D01D 1/02; D01F 2/00
USPC ...... 264/186; 524/27, 35, 41, 47; 536/123.1, 536/123.12, 124
See application file for complete search history.

(56) References Cited

U.S. PATENT DOCUMENTS

| | | | | |
|---|---|---|---|---|
| 4,357,389 A | * | 11/1982 | Satoh ........................ | C08L 1/08 428/364 |
| 5,484,903 A | * | 1/1996 | Szablikowski ......... | C08B 31/06 536/124 X |
| 5,491,223 A | * | 2/1996 | Okamoto ................ | C08B 37/00 536/18.7 |
| 2008/0090984 A1 | * | 4/2008 | Namikoshi ............ | C08G 63/06 536/124 |

FOREIGN PATENT DOCUMENTS

WO    WO-2014105698 A1 *  7/2014  ............ C07H 13/04

\* cited by examiner

*Primary Examiner* — Leo B Tentoni

(57) ABSTRACT

A process is disclosed herein comprising the steps:
  a) contacting an esterifying agent and a polysaccharide in the presence of a first solvent and suitable reaction conditions for a reaction time sufficient to form a product comprising a polysaccharide ester composition, the polysaccharide ester composition comprising a polysaccharide ester having a degree of substitution of about 0.001 to about 3;
  wherein the esterifying agent comprises an acyl halide, a phosphoryl halide, a carboxylic acid anhydride, a haloformic acid ester, a carbonic acid ester, or a vinyl ester; and
  the ratio of esterifying agent to polysaccharide is in the range of about 0.001:1 to about 3:1 on a molar equivalent basis;
  b) combining the product obtained in step a) with polyacrylonitrile; and
  c) spinning fibers.

13 Claims, 1 Drawing Sheet

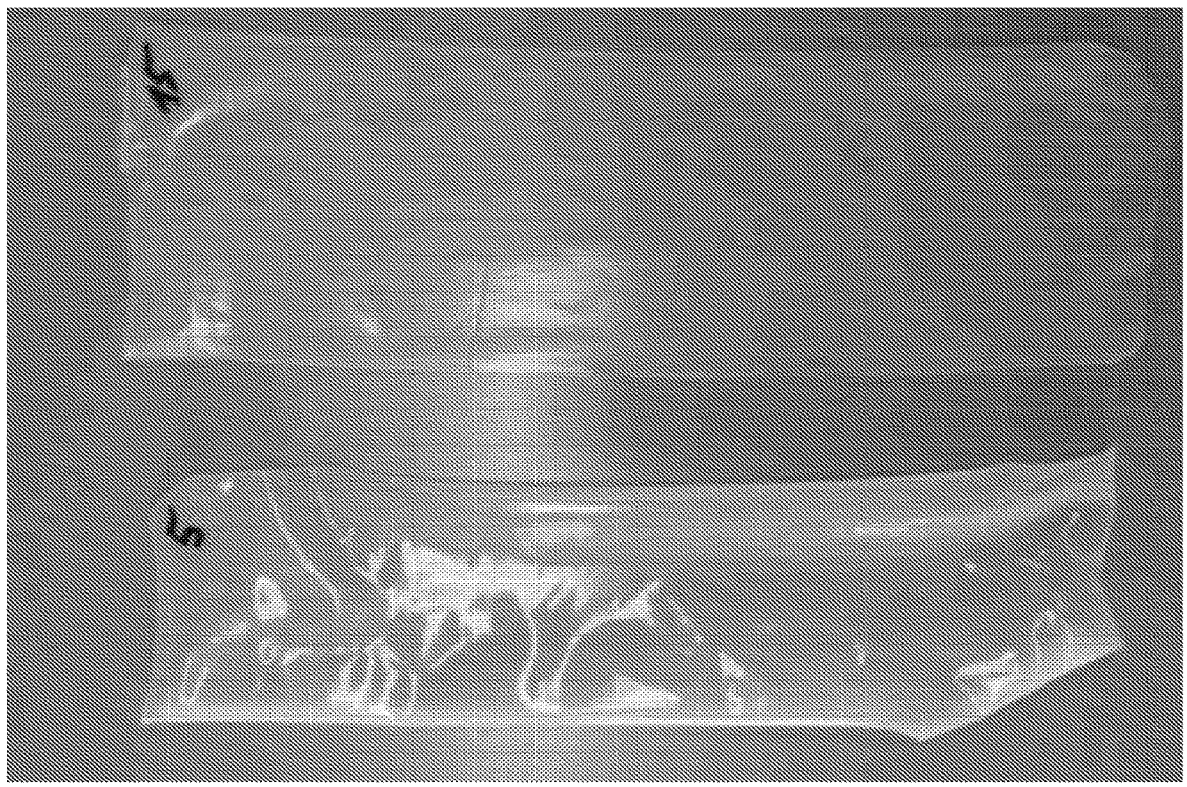

PROCESS FOR MAKING POLYACRYLONITRILE FIBERS

CROSS-REFERENCE TO RELATED APPLICATIONS

This application is a continuation of application Ser. No. 16/461,455 (filed May 16, 2019) (now patent Ser. No. 11/248,314), which is the National Stage application of International Application No. PCT/US2017/62524 (filed Nov. 20, 2017), which claims priority to U.S. Provisional Application No. 62/425,323 (filed Nov. 22, 2016), the disclosures of which prior applications are incorporated herein by reference in their entirety.

FIELD OF THE DISCLOSURE

The field relates to processes for preparing functionalized polysaccharide compositions by in situ derivatization of polysaccharides generated in enzymatic polymerization processes. The functionalized polysaccharide compositions can be used with minimal additional processing steps in applications such as spinning acrylic fibers.

BACKGROUND

Polysaccharides are an important class of polymers and can be used in many industries as structural water insoluble materials and as water soluble polymers. Polysaccharide derivatives can be extracted through nature in low quantities such as xanthan and guar gums. The process and low quantity limits the applications into specialty applications, such as in rheology modifiers and personal care products. More abundant non-derivative polysaccharides such as cellulose and starch can be used as starting material for derivatization but require extensive processing and high degrees of purification. Once the starting material is extracted, the polysaccharide typically requires an activation step that can include solution, alteration of crystalline state, reagent complexation prior to derivatization. The chemical derivatization often uses co-solvents and salts to modify the solubility of the starting material and product such as in the typical acetylation processes.

Driven by a desire to find new structural polysaccharides using enzymatic syntheses or genetic engineering of microorganisms or plant hosts, researchers have discovered polysaccharides that are biodegradable, and that can be made economically from renewable resource-based feedstocks. An example of such a polysaccharide is poly alpha-1,3-glucan, a glucan polymer characterized by having alpha-1,3-glycosidic linkages. This polymer has been isolated by contacting an aqueous solution of sucrose with a glucosyltransferase enzyme isolated from *Streptococcus salivarius* (Simpson et al., Microbiology 141:1451-1460, 1995). Furthermore, polysaccharides of different linkages, content of primary and secondary hydroxyl, tuned molecular weight, branched and linear architecture, crystallinity, and solubility can be isolated and functionalized.

U.S. Pat. No. 9,278,988 discloses poly alpha-1,3-glucan ester compounds and methods of making them. Published patent application WO 2017/003808 discloses poly alpha-1,3-glucan esters and methods of their preparation using cyclic organic acid anhydrides.

More convenient and more economical processes for functionalization of polysaccharides such as poly alpha-1,3-glucan continue to be sought.

SUMMARY

Disclosed herein are processes for making fibers comprising a blend of polyacrylonitrile and polysaccharide ester compositions. In one embodiment a process is disclosed, the process comprising the steps:

a) contacting an esterifying agent and a polysaccharide in the presence of a first solvent and suitable reaction conditions for a reaction time sufficient to form a product comprising a polysaccharide ester composition, the polysaccharide ester composition comprising a polysaccharide ester having a degree of substitution of about 0.001 to about 3;

wherein the esterifying agent comprises an acyl halide, a phosphoryl halide, a carboxylic acid anhydride, a haloformic acid ester, or a carbonic acid ester, or a vinyl ester; and the ratio of esterifying agent to polysaccharide is in the range of about 0.001:1 to about 3:1 on a molar equivalent basis;

b) combining the product obtained in step a) with polyacrylonitrile; and c) spinning fibers.

In one embodiment, the polyacrylonitrile has a number average molecular weight in the range of from about 20,000 to about 100,000.

In an additional embodiment, the esterifying agent comprises an acyl halide, and the first solvent is selected from dimethylacetamide, tetrahydrofuran, acetonitrile, acetone, methyl ethyl ketone, or a mixture thereof. In a further embodiment, the acyl halide comprises acetyl chloride, benzoyl chloride, propanoyl chloride, hexanoyl chloride, acetyl bromide, benzoyl bromide, propanoyl bromide, acetyl iodide, benzoyl iodide, or propanoyl iodide. In yet another embodiment, the esterifying agent is a phosphoryl halide, a carboxylic acid anhydride, a haloformic acid ester, a carbonic acid ester, or a vinyl ester, and the first solvent is selected from dimethylacetamide, dimethylformamide, tetrahydrofuran, acetonitrile, acetone, methyl ethyl ketone, or a mixture thereof.

In some embodiments, step b) further comprises a step of dissolving or dispersing the polyacrylonitrile in a second solvent. In one embodiment, the second solvent is the same as the first solvent in step a). In another embodiment, the second solvent is different from the first solvent in step a).

In some embodiments, the suitable reaction conditions include a reaction temperature in the range of about 30° C. to about 175° C. In some embodiments, the suitable reaction conditions include a reaction pressure of about atmospheric pressure, less than atmospheric pressure, or greater than atmospheric pressure.

In some embodiments, the polysaccharide comprises poly alpha-1,3-glucan, poly alpha-1,3-1,6-glucan, water insoluble alpha-(1,3-glucan) polymer having 90% or greater alpha-1,3-glycosidic linkages, less than 1% by weight of alpha-1,3,6-glycosidic branch points, and a number average degree of polymerization in the range of from 55 to 10,000; or dextran. In one embodiment, the polysaccharide comprises poly alpha-1,3-glucan.

In some embodiments, the polysaccharide ester composition comprises a polysaccharide ester compound having a degree of substitution of about 0.3 to about 1.5.

In one embodiment, the step a) contacting an esterifying agent with a polysaccharide in the presence of a first solvent further comprises the steps of:

i) contacting the polysaccharide and the first solvent to form an initial mixture comprising water;

ii) heating the initial mixture;

iii) removing at least a portion of the water from the initial mixture to obtain a mixture comprising a reduced water content; and iv) adding the esterifying agent to the mixture comprising a reduced water content.

In another embodiment, the process further comprises a step of removing at least a portion of the byproduct acid halide formed in the contacting step a).

Another embodiment relates to the fibers prepared by the processes disclosed herein, wherein the fibers comprise polyacrylonitrile and a polysaccharide ester compound having a degree of substitution of about 0.001 to about 3, wherein at least one ester group of the polysaccharide ester compound comprises a $C_2$-$C_{20}$ acyl group.

BRIEF DESCRIPTION OF THE DRAWING

The disclosure is illustrated by way of example and not limited to the accompanying figures.

FIG. 1 is a reproduction of a photograph of the films prepared in Example 16.

DETAILED DESCRIPTION

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e., occurrences) of the element or component. Therefore "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", "1-2", "1-2 & 4-5", "1-3 & 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The term "esterifying agent" refers to any compound that can react with another compound to form an ester as the reaction product. Esterification is the general name for a chemical reaction in which two reactants, typically an alcohol and an acid, form an ester as the reaction product.

As used herein, the term "polysaccharide" means a polymeric carbohydrate molecule composed of long chains of monosaccharide units bound together by glycosidic linkages and on hydrolysis give the constituent monosaccharides or oligosaccharides.

The abbreviation "PAN" as used herein refers to polyacrylonitrile, also known as Creslan 61. It is a synthetic, semicrystalline organic polymer resin with the linear formula $(C_3H_3N)_n$.

The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 90%, 100%, 125%, 150%, 175%, or 200% (or any integer between 1% and 200%) more than the quantity or activity for which the increased quantity or activity is being compared.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by techniques such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by techniques such as gel permeation chromatography, viscometry via the (Mark-Houwink equation), and colligative methods such as vapor pressure osmometry, end-group determination, or proton NMR.

The term "fabric", as used herein, refers to a multilayer construction of fibers or yarns.

The term "fiber" as used herein refers to an elongate body the length dimension of which is much greater than the transverse dimensions of width and thickness. Accordingly, the term fiber includes monofilament fiber, multifilament fiber, ribbon, strip, a plurality of any one or combinations thereof and the like having regular or irregular cross-section.

The term "yarn" as used herein refers to a continuous strand of fibers.

The term "textile" as used herein refers to garments and other articles fabricated from fibers, yarns, or fabrics when the products retain the characteristic flexibility and drape of the original fabrics.

The present disclosure is directed to a process for spinning fibers comprising polyacrylonitrile and a polysaccharide ester composition. The process comprises in situ esterification of a polysaccharide to form a product comprising a polysaccharide ester composition, followed by combining the polysaccharide ester composition with polyacrylonitrile and spinning fibers. In one embodiment, fibers prepared by the process comprise polyacrylonitrile and a polysaccharide ester compound having a degree of substitution of about 0.001 to about 3, wherein at least one ester group of the polysaccharide ester compound comprises a $C_2$-$C_{20}$ acyl group.

In one embodiment, the process comprises the steps:
a) contacting an esterifying agent and a polysaccharide in the presence of a first solvent and suitable reaction conditions for a reaction time sufficient to form a product comprising a polysaccharide ester composition, the polysaccharide ester composition comprising a polysaccharide ester having a degree of substitution of about 0.001 to about 3;
wherein the esterifying agent comprises an acyl halide, a phosphoryl halide, a carboxylic acid anhydride, a haloformic acid ester, a carbonic acid ester, or a vinyl ester; and the ratio of esterifying agent to polysaccharide is in the range of about 0.001:1 to about 3:1 on a molar equivalent basis;
b) combining the product obtained in step a) with polyacrylonitrile; and
c) spinning fibers.

An advantage of the in situ preparation of polysaccharide ester compositions is the ability to use the material in a further processing step without the need to isolate the esterified polysaccharide from the reaction mixture, or from the solvent. In this way, polysaccharide ester compositions can be combined with other polymers to form a blend, and the blend can be used for various applications, including forming films, coating substrates, spinning fibers comprising the blend of polymer and esterified polysaccharide, and other applications.

The first step of the process comprises the step:
a) contacting an esterifying agent and a polysaccharide in the presence of a first solvent and suitable reaction conditions for a reaction time sufficient to form a product comprising a polysaccharide ester composition, the polysaccharide ester composition comprising a polysaccharide ester having a degree of substitution of about 0.001 to about 3;
wherein the esterifying agent comprises an acyl halide, a phosphoryl halide, a carboxylic acid anhydride, a haloformic acid ester, a carbonic acid ester; or a vinyl ester; and
the ratio of esterifying agent to polysaccharide is in the range of about 0.001:1 to about 3:1 molar equivalents.

The process comprises contacting an esterifying agent and a polysaccharide in the presence of a solvent and suitable reaction conditions to form a product comprising a polysaccharide ester composition, the polysaccharide ester composition comprising a polysaccharide ester compound having a degree of substitution of about 0.001 to about 3. The degree of substitution of about 0.001 to about 3.0 also encompasses 0.001, 0.005, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8 and 2.9, as well as 0.001 and 3 and any value in between 0.001 and 3.

In one embodiment, the esterifying agent comprises an acyl halide, a phosphoryl halide, a carboxylic acid anhydride, a haloformic acid ester, a carbonic acid ester, or a vinyl ester. Mixtures of these may also be used. The ratio of the esterifying agent to the polysaccharide determines the degree of substitution (DoS) of the polysaccharide ester composition, with higher ratios providing higher DoS of the product, as described herein below.

In one embodiment, the esterifying agent comprises an acyl halide. Suitable acyl halides include acyl chlorides, acyl bromides, acyl iodides, and mixtures thereof. Useful acyl chlorides include acetyl chloride, benzoyl chloride, propanoyl chloride, butanoyl chloride, pentanoyl chloride, hexanoyl chloride, heptanoyl chloride, octanoyl chloride, nonanoyl chloride, decanoyl chloride, undecanoyl chloride, dodecanoyl chloride, lauryl chloride, and branched isomers thereof. In one embodiment, the acyl halide comprises acetyl chloride, benzoyl chloride, propanoyl chloride, hexanoyl chloride, acetyl bromide, benzoyl bromide, propanoyl bromide, acetyl iodide, benzoyl iodide, or propanoyl iodide. In one embodiment, the acyl halide comprises acetyl chloride. In one embodiment, the acyl halide comprises benzoyl chloride. In one embodiment, the acyl halide comprises propanoyl halide. In one embodiment, the acyl halide comprises lauryl chloride. Acyl halides can be obtained commercially or prepared by known methods.

In one embodiment, the esterifying agent comprises a phosphoryl halide. Useful phosphoryl halides include phosphoryl chlorides and phosphoryl bromides. Suitable phosphoryl halides include those having the structural formula P(O)(OR)(OR')X, wherein R and R' can be the same or different from each other and are independently selected from $C_1$-$C_8$ alkyl or $C_6$-$C_{10}$ aryl radical, and X is Cl, Br, or I. In one embodiment, the phosphoryl halide comprises diphenyl phosphoryl chloride, diethyl phosphoryl chloride, or diisopropyl phosphoryl chloride. Phosphoryl halides can be obtained commercially or prepared by known methods.

In one embodiment, the esterifying agent comprises a carboxylic acid anhydride. Suitable anhydrides include alkyl anhydrides, cyclic anhydrides, and aromatic anhydrides. The anhydrides can comprise from three to twelve carbon atoms and may be optionally substituted with alkyl substituents. Examples of suitable carboxylic acid anhydrides include acetic anhydride, propionic anhydride, benzoic anhydride, maleic anhydride, succinic anhydride, and glutaric anhydride. In one embodiment, the carboxylic acid anhydride comprises maleic anhydride. In one embodiment, the carboxylic acid anhydride comprises acetic anhydride. In one embodiment, the carboxylic acid anhydride comprises propionic anhydride. In one embodiment, the carboxylic acid anhydride comprises benzoic anhydride. Carboxylic acid anhydrides can be obtained commercially or prepared using known methods.

In one embodiment, the esterifying agent comprises a haloformic acid ester. Suitable haloformic acid esters include phenyl fluoroformate, phenyl chloroformate, and p-NO$_2$-phenyl chloroformate. Haloformic acid esters can be obtained commercially or prepared using known methods.

In one embodiment, the esterifying agent comprises a carbonic acid ester. Suitable carbonic acid esters include chlorocarbonic acid ethyl ester, chlorocarbonic acid methyl ester, and chlorocarbonic acid propyl ester. Carbonic acid esters can be obtained commercially or prepared using known methods.

In another embodiment, the esterifying agent comprises a vinyl ester. Suitable vinyl esters include, for example, vinyl acetate, vinyl benzoate, vinyl 4-tert-butylbenzoate, vinyl chloroformate, vinyl cinnamate, vinyl decanoate, vinyl neodecanoate, vinyl neononanoate, vinyl pivalate, vinyl propionate, vinyl stearate, vinyl trifluoroacetate, and vinyl valerate. In one embodiment, the vinyl ester comprises vinyl acetate. In another embodiment, the vinyl ester comprises vinyl benzoate. Vinyl esters can be obtained commercially or prepared using known methods.

In the processes discloses herein, polysaccharides including poly alpha-1,3-glucan; poly alpha-1,3-1,6-glucan; water insoluble alpha-(1,3-glucan) polymer having 90% or greater alpha-1,3-glycosidic linkages, less than 1% by weight of alpha-1,3,6-glycosidic branch points, and a number average degree of polymerization in the range of from 55 to 10,000; and dextran can be used. Mixtures of these polysaccharides can also be used.

In one embodiment, the polysaccharide comprises poly alpha-1,3-glucan. The terms "poly alpha-1,3-glucan", "alpha-1,3-glucan polymer" and "glucan polymer" are used interchangeably herein. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows:

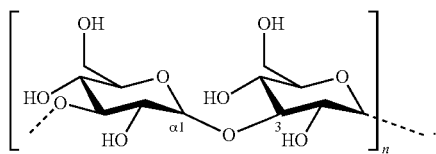

The poly alpha-1,3-glucan can be prepared using chemical methods, or it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes, as described in U.S. Pat. Nos. 7,000,000; 8,642,757; and 9,080,195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried, for example under atmospheric or reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

The poly alpha-1,3-glucan used to produce poly alpha-1, 3-glucan ester compositions as described herein is preferably linear/unbranched. In certain embodiments, poly alpha-1,3-glucan has no branch points or less than about 10%, 9%, 8%, 7%, 6%, 5%, 4%, 3%, 2% or 1% branch points as a percent of the glycosidic linkages in the polymer. Examples of branch points include alpha-1,6 branch points, such as those present in mutan polymer.

The $M_n$ or $M_w$ of poly alpha-1,3-glucan used to prepare poly alpha-1,3-glucan ester compositions as described herein may be at least about 500 to about 300000. Alternatively, $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

The poly alpha-1,3-glucan can be used as a dry powder, for example, containing less than 5% by weight or water, or in other embodiments, the poly alpha-1,3-glucan can be used a wet cake, containing greater than 5% by weight of water. Depending on the amount of water contained in the glucan, sufficient esterifying agent in excess of that required for the desired degree of substitution in the product polysaccharide ester composition can be used in the contacting step, or the water can be removed before the esterifying agent is added. Water content of the glucan can be determined by methods known in the art, for example by using an automatic moisture analyzer by weight difference.

In one embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

The phrase "alpha-(1,3-glucan) polymer" means a polysaccharide comprising glucose monomer units linked together by glycosidic linkages wherein at least 50% of the glycosidic linkages are α-1,3-glycosidic linkages. In other embodiments, the percentage of α-1,3-glycosidic linkages can be greater than or equal to 90%, 95%, 96%, 97%, 98%, 99% or 100% (or any integer value between 50% and 100%). Accordingly, the α-(1,3→glucan) polymer comprises less than or equal to 10%, 5%, 4%, 3%, 2%, 1% or 0% of glycosidic linkages that are not α-1,3-glycosidic linkages. The α-(1,3→glucan) polymer also has a number average degree of polymerization in the range of from 55 to 10,000.

In one embodiment, the polysaccharide is poly alpha-1, 3-1,6-glucan. In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 1000; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages. The term "alpha-1,6-glycosidic linkage" as used herein refers to the covalent bond that joins alpha-D-glucose molecules to each other through carbons 1 and 6 on adjacent alpha-D-glucose rings.

Poly alpha-1,3-1,6-glucan is a product of a glucosyltransferase enzyme, as disclosed in United States Patent Application Publication 2015/0232785 A1.

The glycosidic linkage profile of a poly alpha-1,3-1,6-glucan herein can be determined using any method known in the art. For example, a linkage profile can be determined using methods that use nuclear magnetic resonance (NMR) spectroscopy (e.g., $^{13}$C NMR or $^1$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The terms "poly alpha-1,3-1,6-glucan" and "alpha-1,3-1, 6-glucan polymer" are used interchangeably herein (note that the order of the linkage denotations "1,3" and "1,6" in these terms is of no moment). Poly alpha-1,3-1,6-glucan herein is a polymer comprising glucose monomeric units linked together by glycosidic linkages (i.e., glucosidic linkages), wherein at least about 30% of the glycosidic linkages are alpha-1,3-glycosidic linkages, and at least about 30% of the glycosidic linkages are alpha-1,6-glycosidic linkages. Poly alpha-1,3-1,6-glucan is a type of polysaccharide containing a mixed glycosidic linkage content. The meaning of the term poly alpha-1,3-1,6-glucan in certain embodiments herein excludes "alternan," which is a glucan containing alpha-1,3 linkages and alpha-1,6 linkages that consecutively alternate with each other (U.S. Pat. No. 5,702,942, U.S. Pat. Appl. Publ. No. 2006/0127328). Alpha-1,3 and alpha-1,6 linkages that "consecutively alternate" with each other can be visually represented by . . . G-1,3-G-1,6-G-1,3-G-1,6-G-1,3-G-1,6-G-1,3-G- . . . , for example, where G represents glucose.

The "molecular weight" of a poly alpha-1,3-1,6-glucan herein can be represented as number-average molecular weight (Me) or as weight-average molecular weight ($M_w$). Alternatively, molecular weight can be represented as Daltons, grams/mole, $DP_w$ (weight average degree of polymerization), or $DP_n$ (number average degree of polymerization). Various means are known in the art for calculating these molecular weight measurements such as with high-pressure liquid chromatography (HPLC), size exclusion chromatography (SEC), or gel permeation chromatography (GPC).

The term "poly alpha-1,3-1,6-glucan wet cake" herein refers to poly alpha-1,3-1,6-glucan that has been separated from a slurry and washed with water or an aqueous solution. Poly alpha-1,3-1,6-glucan is not completely dried when preparing a wet cake. Depending on the amount of water contained in the glucan, sufficient esterifying agent in excess of that required for the desired degree of substitution in the product polysaccharide ester composition can be used in the contacting step, or the water can be removed before the esterifying agent is added.

An "aqueous composition" herein refers to a solution or mixture in which the solvent is at least about 20 wt % water, for example, and which comprises poly alpha-1,3-1,6-glucan. Examples of aqueous compositions herein are aqueous solutions and hydrocolloids.

In some embodiments:
(i) at least 30% of the glycosidic linkages of the poly alpha-1,3-1,6-glucan are alpha-1,3 linkages,
(ii) at least 30% of the glycosidic linkages of the poly alpha-1,3-1,6-glucan are alpha-1,6 linkages,
(iii) the poly alpha-1,3-1,6-glucan has a weight average degree of polymerization ($DP_w$) of at least 1000; and
(iv) the alpha-1,3 linkages and alpha-1,6 linkages of the poly alpha-1,3-1,6-glucan do not consecutively alternate with each other.

At least 30% of the glycosidic linkages of poly alpha-1, 3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

Other examples of alpha-1,3 and alpha-1,6 linkage profiles and methods for their product are disclosed in published United States patent application 2015/0232785. The linkages and DPw of Glucan produced by various Gtf Enzymes, as disclosed in US 2015/0232785, are listed in Table 1.

TABLE 1

Linkages and $DP_w$ of Glucan Produced by Various Gtf Enzymes

| Gtf | Glucan Alpha Linkages | | $DP_w$ |
|---|---|---|---|
| | % 1,3 | % 1,6 | |
| 4297 | 31 | 67 | 10540 |
| 3298 | 50 | 50 | 1235 |
| 0544 | 62 | 36 | 3815 |
| 5618 | 34 | 66 | 3810 |
| 2379 | 37 | 63 | 1640 |

The backbone of a poly alpha-1,3-1,6-glucan disclosed herein can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G- . . . (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan can have a $DP_w$ of at least about 1000. For example, the $DP_w$ of the poly alpha-1,3-1,6-glucan can be at least about 10000. Alternatively, the $DP_w$ can be at least about 1000 to about 15000. Alternatively still, the $DP_w$ can be at least about 1000, 2000, 3000, 4000, 5000, 6000, 7000, 8000, 9000, 10000, 11000, 12000, 13000, 14000, or 15000 (or any integer between 1000 and 15000), for example. Given that a poly alpha-1,3-1,6-glucan herein can have a $DP_w$ of at least about 1000, such a glucan polymer is typically water-insoluble.

A poly alpha-1,3-1,6-glucan can have an $M_w$ of at least about 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 4000, 5000, 10000, 20000, 30000, or 40000, for example.

A poly alpha-1,3-1,6-glucan herein can comprise at least 20 glucose monomeric units, for example. Alternatively, the number of glucose monomeric units can be at least 25, 50, 100, 500, 1000, 2000, 3000, 4000, 5000, 6000, 7000, 8000, or 9000 (or any integer between 10 and 9000), for example.

Poly alpha-1,3-1,6-glucan can be used as a dry powder or as a wet cake containing greater than 5% by weight of water.

In some embodiments, the polysaccharide comprises dextran. In one embodiment, the dextran comprises:
 (i) 87-93% alpha-1,6 glycosidic linkages;
 (ii) 0.1-1.2% alpha-1,3-glycosidic linkages;
 (iii) 0.1-0.7% alpha-1,4-glycosidic linkages;
 (iv) 7.7-8.6% alpha-1,3,6-glycosidic linkages;
 (v) 0.4-1.7% alpha-1,2,6-glycosidic or alpha-1,4,6-glycosidic linkages
wherein the weight-average molecular weight (Mw) of the dextran is about 50-200 million Daltons, the z-average radius of gyration of the dextran is about 200-280 nm. Optionally, the dextran is not a product of *Leuconostoc mesenteroides* glucosyltransferase enzyme. In other embodiments, the coating composition consists essentially of the dextran polymer having (i) about 89.5-90.5 wt % glucose linked at positions 1 and 6; (ii) about 0.4-0.9 wt % glucose linked at positions 1 and 3; (iii) about 0.3-0.5 wt % glucose linked at positions 1 and 4; (iv) about 8.0-8.3 wt % glucose linked at positions 1, 3 and 6; and (v) about 0.7-1.4 wt % glucose linked at: (a) positions 1, 2 and 6, or (b) positions 1, 4 and 6.

The terms "dextran", "dextran polymer" and "dextran compound" are used interchangeably herein and refer to complex, branched alpha-glucans generally comprising chains of substantially (mostly) alpha-1,6-linked glucose monomers, with side chains (branches) linked mainly by alpha-1,3-linkage. The term "gelling dextran" herein refers to the ability of one or more dextrans disclosed herein to form a viscous solution or gel-like composition (i) during enzymatic dextran synthesis and, optionally, (ii) when such synthesized dextran is isolated (e.g., >90% pure) and then placed in an aqueous composition.

Dextran "long chains" herein can comprise "substantially [or mostly] alpha-1,6-glycosidic linkages", meaning that they can have at least about 98.0% alpha-1,6-glycosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and comprising less than about 10% of all the glucose monomers of a dextran polymer. Such short chains typically comprise alpha-1,2-, alpha-1,3-, and/or alpha-1,4-glycosidic linkages (it is believed that there can also be a small percentage of such non-alpha-1,6 linkages in long chains in some aspects).

The "molecular weight" of dextran herein can be represented as number-average molecular weight (Mn) or as weight-average molecular weight (Mw), the units of which are in Daltons or grams/mole. Alternatively, molecular weight can be represented as DPw (weight average degree of polymerization) or DPn (number average degree of polymerization). Various means are known in the art for calculating these molecular weight measurements such as with high-pressure liquid chromatography (HPLC), size exclusion chromatography (SEC), or gel permeation chromatography (GPC).

The term "radius of gyration" (Rg) herein refers to the mean radius of dextran, and is calculated as the root-mean-square distance of a dextran molecule's components (atoms) from the molecule's center of gravity. Rg can be provided in Angstrom or nanometer (nm) units, for example. The "z-average radius of gyration" of dextran herein refers to the Rg of dextran as measured using light scattering (e.g., MALS). Methods for measuring z-average Rg are known and can be used herein, accordingly. For example, z-average Rg can be measured as disclosed in U.S. Pat. No. 7,531,073, U.S. Patent Appl. Publ. Nos. 2010/0003515 and 2009/0046274, Wyatt (Anal. Chim. Acta 272:1-40), and Mori and Barth (Size Exclusion Chromatography, Springer-Verlag, Berlin, 1999), all of which are incorporated herein by reference.

The dextran polymer can be produced via an enzymatic process using glucosyltransferase enzyme comprising an amino acid sequence that is described in United States Patent Application Publication 2016/0122445 A1. In some embodiments, the dextran can comprise (i) about 87-93 wt % glucose linked only at positions 1 and 6; (ii) about 0.1-1.2 wt % glucose linked only at positions 1 and 3; (iii) about 0.1-0.7 wt % glucose linked only at positions 1 and 4; (iv) about 7.7-8.6 wt % glucose linked only at positions 1, 3 and 6; and (v) about 0.4-1.7 wt % glucose linked only at: (a) positions 1, 2 and 6, or (b) positions 1, 4 and 6. In certain embodiments, a dextran can comprise (i) about 89.5-90.5 wt % glucose linked only at positions 1 and 6; (ii) about 0.4-0.9 wt % glucose linked only at positions 1 and 3; (iii) about 0.3-0.5 wt % glucose linked only at positions 1 and 4; (iv) about 8.0-8.3 wt % glucose linked only at positions 1, 3 and 6; and (v) about 0.7-1.4 wt % glucose linked only at: (a) positions 1, 2 and 6, or (b) positions 1, 4 and 6.

In other embodiments, the dextran polymer can comprise about 87, 87.5, 88, 88.5, 89, 89.5, 90, 90.5, 91, 91.5, 92, 92.5, or 93 wt % glucose linked only at positions 1 and 6. There can be about 87-92.5, 87-92, 87-91.5, 87-91, 87-90.5, 87-90, 87.5-92.5, 87.5-92, 87.5-91.5, 87.5-91, 87.5-90.5, 87.5-90, 88-92.5, 88-92, 88-91.5, 88-91, 88-90.5, 88-90, 88.5-92.5, 88.5-92, 88.5-91.5, 88.5-91, 88.5-90.5, 88.5-90, 89-92.5, 89-92, 89-91.5, 89-91, 89-90.5, 89-90, 89.5-92.5, 89.5-92, 89.5-91.5, 89.5-91, or 89.5-90.5 wt % glucose linked only at positions 1 and 6, in some instances.

In other embodiments, the dextran polymer can comprise about 0.1, 0.2, 0.3, 0.4, 0.5, 0.6, 0.7, 0.8, 0.9, 1.0, 1.1, or 1.2 wt % glucose linked only at positions 1 and 3. There can be about 0.1-1.2, 0.1-1.0, 0.1-0.8, 0.3-1.2, 0.3-1.0, 0.3-0.8, 0.4-1.2, 0.4-1.0, 0.4-0.8, 0.5-1.2, 0.5-1.0, 0.5-0.8, 0.6-1.2, 0.6-1.0, or 0.6-0.8 wt % glucose linked only at positions 1 and 3, in some instances.

In other embodiments, the dextran polymer can comprise about 0.1, 0.2, 0.3, 0.4, 0.5, 0.6, or 0.7 wt % glucose linked only at positions 1 and 4. There can be about 0.1-0.7, 0.1-0.6, 0.1-0.5, 0.1-0.4, 0.2-0.7, 0.2-0.6, 0.2-0.5, 0.2-0.4, 0.3-0.7, 0.3-0.6, 0.3-0.5, or 0.3-0.4 wt % glucose linked only at positions 1 and 4, in some instances.

In other embodiments, the dextran polymer can comprise about 7.7, 7.8, 7.9, 8.0, 8.1, 8.2, 8.3, 8.4, 8.5, or 8.6 wt % glucose linked only at positions 1, 3 and 6. There can be about 7.7-8.6, 7.7-8.5, 7.7-8.4, 7.7-8.3, 7.7-8.2, 7.8-8.6, 7.8-8.5, 7.8-8.4, 7.8-8.3, 7.8-8.2, 7.9-8.6, 7.9-8.5, 7.9-8.4, 7.9-8.3, 7.9-8.2, 8.0-8.6, 8.0-8.5, 8.0-8.4, 8.0-8.3, 8.0-8.2, 8.1-8.6, 8.1-8.5, 8.1-8.1, 8.1-8.3, or 8.1-8.2 wt % glucose linked only at positions 1, 3 and 6, in some instances.

In other embodiments, the dextran polymer can comprise about 0.4, 0.5, 0.6, 0.7, 0.8, 0.9, 1.0, 1.1, 1.2, 1.3, 1.4, 1.5, 1.6, or 1.7 wt % glucose linked only at (a) positions 1, 2 and 6, or (b) positions 1, 4 and 6. There can be about 0.4-1.7, 0.4-1.6, 0.4-1.5, 0.4-1.4, 0.4-1.3, 0.5-1.7, 0.5-1.6, 0.5-1.5, 0.5-1.4, 0.5-1.3, 0.6-1.7, 0.6-1.6, 0.6-1.5, 0.6-1.4, 0.6-1.3, 0.7-1.7, 0.7-1.6, 0.7-1.5, 0.7-1.4, 0.7-1.3, 0.8-1.7, 0.8-1.6, 0.8-1.5, 0.8-1.4, 0.8-1.3 wt % glucose linked only at (a) positions 1, 2 and 6, or (b) positions 1, 4 and 6, in some instances.

It is believed that dextran herein may be a branched structure in which there are long chains (containing mostly or all alpha-1,6-linkages) that iteratively branch from each other (e.g., a long chain can be a branch from another long chain, which in turn can itself be a branch from another long chain, and so on). The branched structure may also comprise short branches from the long chains; these short chains are believed to mostly comprise alpha-1,3 and -1,4 linkages, for example. Branch points in the dextran, whether from a long chain branching from another long chain, or a short chain branching from a long chain, appear to comprise alpha-1,3, -1,4, or -1,2 linkages off of a glucose involved in alpha-1,6 linkage. On average, about 20%, 21%, 22%, 23%, 24%, 25%, 26%, 27%, 28%, 29%, 30%, 15-35%, 15-30%, 15-25%, 15-20%, 20-35%, 20-30%, 20-25%, 25-35%, or 25-30% of all branch points of dextran in some embodiments branch into long chains. Most (>98% or 99%) or all the other branch points branch into short chains.

The long chains of a dextran branching structure can be similar in length in some aspects. By being similar in length, it is meant that the length (DP) of at least 70%, 75%, 80%, 85%, or 90% of all the long chains in a branching structure is within plus/minus 15% (or 10%, 5%) of the mean length of all the long chains of the branching structure. In some aspects, the mean length (average length) of the long chains is about 10-50 DP (i.e., 10-50 glucose monomers). For example, the mean individual length of the long chains can be about 10, 15, 16, 17, 18, 19, 20, 21, 22, 23, 24, 25, 30, 35, 40, 45, 50, 10-50, 10-40, 10-30, 10-25, 10-20, 15-50, 15-40, 15-30, 15-25, 15-20, 20-50, 20-40, 20-30, or 20-25 DP.

Dextran long chains in certain embodiments can comprise substantially alpha-1,6-glycosidic linkages and a small amount (less than 2.0%) of alpha-1,3- and/or alpha-1,4-glycosidic linkages. For example, dextran long chains can comprise about, or at least about, 98%, 98.25%, 98.5%, 98.75%, 99%, 99.25%, 99.5%, 99.75%, or 99.9% alpha-1, 6-glycosidic linkages. A dextran long chain in certain embodiments does not comprise alpha-1,4-glycosidic linkages (i.e., such a long chain has mostly alpha-1,6 linkages and a small amount of alpha-1,3 linkages). Conversely, a dextran long chain in some embodiments does not comprise alpha-1,3-glycosidic linkages (i.e., such a long chain has mostly alpha-1,6 linkages and a small amount of alpha-1,4 linkages). Any dextran long chain of the above embodiments may further not comprise alpha-1,2-glycosidic linkages, for example. Still in some aspects, a dextran long chain can comprise 100% alpha-1,6-glycosidic linkages (excepting the linkage used by such long chain to branch from another chain).

Short chains of a dextran molecule in some aspects are one to three glucose monomers in length and comprise less than about 5-10% of all the glucose monomers of the dextran polymer. At least about 90%, 91%, 92%, 93%, 94%, 95%, 96%, 97%, 98%, 99%, or all of, short chains herein are 1-3 glucose monomers in length. The short chains of a dextran molecule can comprise less than about 10%, 9%, 8%, 7%, 6%, 5%, 4%, 3%, 2%, or 1% of all the glucose monomers of the dextran molecule, for example.

Short chains of a dextran molecule in some aspects can comprise alpha-1,2-, alpha-1,3-, and/or alpha-1,4-glycosidic linkages. Short chains, when considered all together (not individually) may comprise (i) all three of these linkages, or (ii) alpha-1,3- and alpha-1,4-glycosidic linkages, for example. It is believed that short chains of a dextran molecule herein can be heterogeneous (i.e., showing some variation in linkage profile) or homogeneous (i.e., sharing similar or same linkage profile) with respect to the other short chains of the dextran.

Dextran in certain embodiments can have a weight average molecular weight (Mw) of about, or at least about, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 million (or any integer between 50 and 200 million) (or any range between two of these values). The Mw of dextran can be about 50-200, 60-200, 70-200, 80-200, 90-200, 100-200, 110-200, 120-200, 50-180, 60-180, 70-180, 80-180, 90-180, 100-180, 110-180, 120-180, 50-160, 60-160, 70-160, 80-160, 90-160, 100-160, 110-160, 120-160, 50-140, 60-140, 70-140, 80-140, 90-140, 100-140, 110-140, 120-140, 50-120, 60-120, 70-120, 80-120, 90-120, 100-120, 110-120, 50-110, 60-110, 70-110, 80-110, 90-110, 100-110, 50-100, 60-100, 70-100, 80-100, 90-100, or 95-105 million, for example. Any of these Mw's can be represented in weight average degree of polymerization (DPw), if desired, by dividing Mw by 162.14.

The z-average radius of gyration of a dextran herein can be about 200-280 nm. For example, the z-average Rg can be about 200, 205, 210, 215, 220, 225, 230, 235, 240, 245, 250, 255, 260, 265, 270, 275, or 280 nm (or any integer between 200-280 nm). As other examples, the z-average Rg can be about 200-280, 200-270, 200-260, 200-250, 200-240, 200-230, 220-280, 220-270, 220-260, 220-250, 220-240, 220-230, 230-280, 230-270, 230-260, 230-250, 230-240, 240-280, 240-270, 240-260, 240-250, 250-280, 250-270, or 250-260 nm.

Contacting an esterifying agent and a polysaccharide in the in situ processes disclosed herein provides a product comprising a polysaccharide ester composition. The polysaccharide ester composition comprises a polysaccharide ester compound having a degree of substitution of about 0.001 to about 3, depending on the amount of water present during the contacting step and the molar ratio of esterifying agent and polysaccharide. In one embodiment, the polysaccharide ester composition comprises a polysaccharide ester having a degree of substitution of about 0.1 to about 1.5, or about 0.3 to about 1.5. In another embodiment, the polysaccharide ester composition comprises a polysaccharide ester having a degree of substitution of 0.001, 0.005, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3, or any value between 0.001 and 3. The polysaccharide ester composition comprises a polysaccharide ester compound wherein at least one ester group comprises a $C_2$-$C_{20}$ acyl group, for example acetyl ester, propionate ester, butyrate ester, pentanoate ester, hexanoate ester, heptanoate ester, octanoate ester, nonoate ester, decyl ester, undecyl ester, dodecyl, laurate, or benzoate ester. Mixtures of different esters can also be obtained by appropriate selection of two or more esterifying agents.

The polysaccharide ester compositions disclosed herein comprise synthetic, man-made compounds in which at least a portion of the hydroxyl groups contained in the polysaccharide starting material are converted to esters. The polysaccharides typically form a slurry in the solvent used in the contacting step, and as the reaction with the esterifying agent proceeds, the polysaccharide ester composition can solubilize and form a solution. As used herein, the phrase "a product comprising a polysaccharide ester composition" also includes at least a portion of the solvent from the contacting step of the process disclosed herein. As used herein, the phrase "product comprising a polysaccharide ester composition" also includes reaction by-products, such as salts, and can optionally comprise excess esterifying agent. Polysaccharide ester compositions disclosed herein encompass polysaccharide ester compositions comprising poly alpha-1,3-glucan ester compounds, polysaccharide ester compositions comprising poly alpha-1,3-1,6-glucan ester compounds, polysaccharide ester compositions comprising ester compounds of water insoluble alpha-(1,3-glucan) polymer having 90% or greater alpha-1,3-glycosidic linkages, less than 1% by weight of alpha-1,3,6-glycosidic branch points, and a number average degree of polymerization in the range of from 55 to 10,000, and polysaccharide ester compositions comprising dextran ester compounds. Mixtures of polysaccharides can also be used. Polysaccharide ester compositions disclosed herein comprise a polysaccharide ester having a degree of substitution of about 0.001 to about 3 and wherein at least one ester group comprises a $C_2$-$C_{20}$ acyl group. In another embodiment, polysaccharide ester compositions disclosed herein comprise a polysaccharide ester having a degree of substitution of about 0.1 to about 3 and wherein at least one ester group comprises a $C_2$-$C_{20}$ acyl group.

The terms "poly alpha-1,3-glucan ester compound", "poly alpha-1,3-glucan ester", and "poly alpha-1,3-glucan ester derivative" are used interchangeably herein. A poly alpha-1,3-glucan ester compound herein can be represented by the structure:

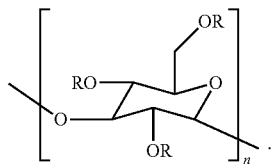

Regarding the formula of this structure, n can be at least 6, and each R can independently be a hydrogen atom (H) or a $C_2$-$C_{20}$ acyl group. A poly alpha-1,3-glucan ester compound herein has a degree of substitution of about 0.001 to about 3.0.

A poly alpha-1,3-glucan ester compound, or an ester compound of the polysaccharide ester compositions disclosed herein, is termed an "ester" herein by virtue of comprising the substructure —$C_G$—O—CO—C—, where "—$C_G$—" represents carbon 2, 4, or 6 of a glucose monomeric unit of a poly alpha-1,3-glucan ester compound, for example, and where "—CO—C—" is comprised in the acyl group. The carbonyl group (—CO—) of the acyl group is ester-linked to carbon 2, 4, or 6 of a glucose monomeric unit of a poly alpha-1,3-glucan ester compound.

Examples of a $C_2$-$C_{20}$ acyl group include the following:
an ethanoyl group (COCH$_3$),
a propanoyl group (COCH$_2$CH$_3$),
a butanoyl group (COCH$_2$CH$_2$CH$_3$),
a pentanoyl group (COCH$_2$CH$_2$CH$_2$CH$_3$),
a hexanoyl group (COCH$_2$CH$_2$CH$_2$CH$_2$CH$_3$),
a heptanoyl group (COCH$_2$CH$_2$CH$_2$CH$_2$CH$_2$CH$_3$),
an octanoyl group (COCH$_2$CH$_2$CH$_2$CH$_2$CH$_2$CH$_2$CH$_3$),
a nonanoyl group (CO—CH$_2$CH$_2$CH$_2$CH$_2$CH$_2$CH$_2$CH$_2$CH$_3$),
a decanoyl group (CO—CH$_2$—CH$_2$CH$_2$CH$_2$CH$_2$CH$_2$CH$_2$CH$_2$CH$_3$),
a undecanoyl group (CO—CH$_2$—CH$_2$—CH$_2$CH$_2$CH$_2$CH$_2$CH$_2$CH$_2$CH$_2$CH$_3$),
a dodecanoyl group (CO—CH$_2$—CH$_2$—CH$_2$—CH$_2$CH$_2$CH$_2$CH$_2$CH$_2$CH$_2$CH$_2$CH$_3$),
a tridecanoyl group (CO—CH$_2$—CH$_2$—CH$_2$—CH$_2$—CH$_2$CH$_2$CH$_2$CH$_2$CH$_2$CH$_2$CH$_2$—CH$_3$),
a tetradecanoyl group (CO—CH$_2$—CH$_2$—CH$_2$—CH$_2$—CH$_2$—CH$_2$CH$_2$CH$_2$CH$_2$CH$_2$—CH$_2$CH$_2$CH$_3$),
a pentadecanoyl group (CO—CH$_2$—CH$_2$—CH$_2$—CH$_2$—CH$_2$—CH$_2$—CH$_2$CH$_2$CH$_2$—CH$_2$CH$_2$CH$_2$CH$_2$CH$_3$),
a hexadecanoyl group (CO—CH$_2$—CH$_2$—CH$_2$—CH$_2$—CH$_2$—CH$_2$—CH$_2$—CH$_2$CH$_2$—CH$_2$CH$_2$CH$_2$CH$_2$CH$_2$CH$_3$),
a heptadecanoyl group (CO—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_3$),
an octadecanoyl group (CO—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_3$),
a nonadecanoyl group (CO—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$),
an eicosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$),
an uneicosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$),
a docosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_3$),
a tricosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$),
a tetracosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$),
a pentacosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$),
a hexacosanoyl group (CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$CH$_2$CH$_2$CH$_2$CH$_2$CH$_2$CH$_2$CH$_2$CH$_3$), and a benzoyl group (CO—C$_6$H$_5$).

Common names for the above are acetyl (ethanoyl group), propionyl (propanoyl group), butyryl (butanoyl group), valeryl (pentanoyl group), caproyl (hexanoyl group); enanthyl (heptanoyl group), caprylyl (octanoyl group), pelargonyl (nonanoyl group), capryl (decanoyl group), lauroyl (dodecanoyl group), myristyl (tetradecanoyl group), palmityl (hexadecanoyl group), stearyl (octadecanoyl group), arachidyl (eicosanoyl group), behenyl (docosanoyl group), lignoceryl (tetracosanoyl group), and cerotyl (hexacosanoyl group).

Regarding nomenclature, a poly alpha-1,3-glucan ester compound can be referenced herein by referring to the organic acid(s) corresponding with the acyl group(s) in the compound. For example, an ester compound comprising acetyl groups can be referred to as a poly alpha-1,3-glucan acetate, an ester compound comprising propionyl groups can be referred to as a poly alpha-1,3-glucan propionate, and an ester compound comprising butyryl groups can be referred to as a poly alpha-1,3-glucan butyrate. However, this nomenclature is not meant to refer to the poly alpha-1,3-glucan ester compounds herein as acids per se. Corresponding nomenclature can be used and intended for ester compounds of poly alpha-1,3-1,6-glucan, of water insoluble alpha-(1,3-glucan) polymer having 90% or greater alpha-1,3-glycosidic linkages, less than 1% by weight of alpha-1,3,6-glycosidic branch points, and a number average degree of polymerization in the range of from 55 to 10,000, and of dextran, which can be present in the polysaccharide ester compositions obtained by the processes disclosed herein.

The terms "polysaccharide mixed ester" and "mixed ester" are used interchangeably herein. A polysaccharide mixed ester contains two or more types of an acyl group. Examples of such mixed esters are poly alpha-1,3-glucan acetate propionate (comprises acetyl and propionyl groups) and poly alpha-1,3-glucan acetate butyrate (comprises acetyl and butyryl groups), wherein the polysaccharide is poly alpha-1,3-glucan.

The terms "organic acid" and "carboxylic acid" are used interchangeably herein. An organic acid has the formula R—COOH, where R is an organic group and COOH is a carboxylic group. The R group herein is typically a saturated linear carbon chain (up to seven carbon atoms). Examples of organic acids are acetic acid ($CH_3$—COOH), propionic acid ($CH_3$—$CH_2$—COOH) and butyric acid ($CH_3$—$CH_2$—$CH_2$—COOH).

The term "degree of substitution" (DoS) as used herein refers to the average number of hydroxyl groups substituted in each monomeric unit (glucose) of a poly alpha-1,3-glucan ester compound or other polysaccharide ester compound disclosed herein. For example, since there are three hydroxyl groups in each monomeric unit in poly alpha-1,3-glucan, the DoS in a poly alpha-1,3-glucan ester compound herein can be no higher than 3.

The "molecular weight" of poly alpha-1,3-glucan, poly alpha-1,3-glucan ester compounds, polysaccharide, and polysaccharide ester compounds disclosed herein can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

In one embodiment, the polysaccharide ester compositions disclosed herein comprise a polysaccharide ester compound containing one type of acyl group. In another embodiment, the polysaccharide ester compositions disclosed herein comprise a polysaccharide ester compound containing two or more different types of acyl groups.

The poly alpha-1,3-glucan ester compound or other polysaccharide ester compound of the polysaccharide ester compositions disclosed herein has a degree of substitution (DoS) of about 0.001 to about 3.0. Alternatively, the DoS of a poly alpha-1,3-glucan ester compound disclosed herein can be about 0.1 to about 1.5, or 0.3 to about 1.5. Alternatively still, the DoS can be at least about 0.001, 0.005, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3, or any value between 0.001 and 3. It would be understood by those skilled in the art that since, for example, a poly alpha-1,3-glucan ester compound disclosed herein has a degree of substitution between about 0.001 to about 3.0, the R groups of the compound cannot only be hydrogen.

The percentage of glycosidic linkages between the glucose monomer units of the poly alpha-1,3-glucan ester compound that are alpha-1,3 is at least about 50%, 60%, 70%, 80%, 90%, 95%, 96%, 97%, 98%, 99%, or 100% (or any integer between 50% and 100%). In such embodiments, accordingly, the compound has less than about 50%, 40%, 30%, 20%, 10%, 5%, 4%, 3%, 2%, 1%, or 0% (or any integer value between 0% and 50%) of glycosidic linkages that are not alpha-1,3.

The backbone of a poly alpha-1,3-glucan ester compound disclosed herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a polysaccharide ester compound, for example a poly alpha-1,3-glucan ester compound, of the polysaccharide ester composition in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000).

The molecular weight of a poly alpha-1,3-glucan ester compound or other polysaccharide ester compound disclosed herein can be measured as number-average molecular weight (Me) or as weight-average molecular weight ($M_w$). Alternatively, molecular weight can be measured in Daltons or grams/mole The poly alpha-1,3-glucan ester may have a weight average degree of polymerization (DPw) of at least about 20. In some embodiments, the poly alpha-1,3-glucan ester has a DPw of from about 20 to about 1400, or from about 20 to about 1000, or from about 40 to about 900.

The $M_n$ or $M_w$ of poly alpha-1,3-glucan ester compounds or other polysaccharide ester compounds disclosed herein may be at least about 1000. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

The esterifying agent and the polysaccharide are contacted in the presence of a solvent. Suitable solvents include those which are inert under the reaction conditions employed and which can optionally solubilize at least a portion of the polysaccharide ester composition produced. Typically, the polysaccharide starting material is not soluble in the solvent and is used as a slurry. Suitable solvents are aprotic solvents. In one embodiment, the esterifying agent comprises an acyl halide and the solvent is selected from dimethylacetamide, tetrahydrofuran, acetonitrile, acetone, methyl ethyl ketone, or a mixture thereof. In another embodiment, the esterifying agent is a phosphoryl halide, a carboxylic acid anhydride, a haloformic acid ester, a carbonic acid ester, or a vinyl ester, and the solvent is selected from dimethylacetamide, dimethylformamide, tetrahydrofuran, acetonitrile, acetone, methyl ethyl ketone, or a mixture thereof. In one embodiment, the solvent comprises dimethylacetamide. In another embodiment, the solvent comprises dimethylformamide. In one embodiment, the solvent is anhydrous, for example containing less than about 0.1 wt % water, based on the total weight of water and solvent. Larger amounts of water in the solvent may necessitate use of excess esterifying agent beyond that required for the desired degree of substitution of the polysaccharide ester composition. Suitable solvents can be obtained commercially.

The product comprising a polysaccharide ester composition also includes the solvent used in the contacting step. Optionally, a portion of the solvent can be removed, for example by distillation, to increase the concentration of the polysaccharide ester composition of the product.

In the processes disclosed herein, the esterifying agent and the polysaccharide are contacted under suitable reaction conditions. Sufficient reaction time, in conjunction with selection of appropriate reaction temperature and reaction pressure, enables formation of a product comprising a polysaccharide ester composition as disclosed herein. Suitable reaction conditions include a reaction temperature in the range of about 30° C. to about 175° C., for example in the range of about 30° C. to about 50° C., or in the range of about 30° C. to about 75° C., or in the range of about 50° C. to about 100° C., or in the range of about 60° C. to about 150° C., or in the range of about 80° C. to about 175° C. The particular esterifying agent and solvent selected for use will influence the choice of reaction temperature as well, as the reaction temperature should be below the boiling point of the esterifying agent and the solvent for ease of process operation. Suitable reaction conditions include a reaction pressure of about atmospheric pressure, less than atmospheric pressure, or greater than atmospheric pressure. Choice of reaction pressure is also influenced by the particular esterifying agent and solvent selected, as lower reaction pressure can be used with higher boiling esterifying agents and solvents, while higher reaction pressure may be needed for use with lower boiling esterifying agents and solvents.

In some embodiments, the step of contacting an esterifying agent with a polysaccharide in the presence of a solvent further comprises the steps of:
  i) contacting the polysaccharide and the solvent to form an initial mixture comprising water;
  ii) heating the initial mixture;
  iii) removing at least a portion of the water from the initial mixture under reduced pressure to obtain a mixture comprising a reduced water content; and
  iv) adding the esterifying agent to the mixture comprising a reduced water content.

These additional steps are useful to remove at least a portion of any water contained in the polysaccharide and/or the solvent. It is desirable to minimize the amount of water present in the contacting step in order to avoid using excess esterifying agent, as any water present will react with the esterifying agent.

In one embodiment, anhydrous solvent and dried polysaccharide are used, and the contacting of the esterifying agent and the polysaccharide in the presence of the solvent and suitable reaction conditions is performed in a manner minimizing moisture intrusion, for example under an atmosphere of dry nitrogen or argon.

As the esterifying agent reacts with the polysaccharide, byproduct acid halide is formed. For example, in the case where acetyl chloride is used as the esterifying agent, byproduct hydrogen chloride is generated as the polysaccharide is functionalized to a polysaccharide ester composition. Optionally, at least a portion of the byproduct acid halide may be removed during or after the contacting step, for example by heating the product comprising a polysaccharide ester composition under reduced pressure, or by contacting the product comprising a polysaccharide ester composition with an acid-exchange resin.

Blending a hydrophilic component (having a strong affinity for water) into a hydrophobic PAN fiber requires imparting miscibility with PAN and ability to spin a fiber. Hydrophilicity can improve the static discharge of the PAN fiber. Hydrophilicity, as approximated by water retention value, can be maintained with polysaccharide esters having low degrees of substitution. Spinning fiber can be maintained by forming a solvent soluble additive. The additive can be miscible or immiscible.

In another aspect, the present disclosure is directed to a process for spinning acrylic fibers. In one embodiment, the process comprises the steps:
  a) contacting an esterifying agent and a polysaccharide in the presence of a first solvent and suitable reaction conditions for a reaction time sufficient to form a product comprising a polysaccharide ester composition, the polysaccharide ester composition comprising a polysaccharide ester having a degree of substitution of about 0.001 to about 3;
  wherein the esterifying agent comprises an acyl halide, a phosphoryl halide, a carboxylic acid anhydride, a haloformic acid ester, a carbonic acid ester, or a vinyl ester; and
  the ratio of esterifying agent to polysaccharide is in the range of about 0.001:1 to about 3:1 on a molar equivalent basis;
  b) combining the product obtained in step a) with polyacrylonitrile; and
  c) spinning fibers.

The polyacrylonitrile typically has a number average molecular weight in the range of from about 20,000 to about 100,000, for example from about 40,000 to about 70,000, or from about 50,000 to about 60,000. The polyacrylonitrile can be prepared by methods known in the art. As used herein, the term "polyacrylonitrile" includes polyacrylonitrile homopolymer and also copolymers of polyacrylonitrile and methyl acrylate, or polyacrylonitrile and vinyl acetate. In such copolymers, the methyl acrylate or vinyl acetate can be present from about 1 weight percent to about 15 weight percent, based on the weight of the copolymer.

In step b), combining the product comprising a polysaccharide ester composition with polyacrylonitrile can be performed by dispersing or dissolving the polyacrylonitrile in a second solvent to form a blend of the polysaccharide ester composition and the polyacrylonitrile. In one embodiment, the second solvent is the same as the solvent present in the contacting step, which is also present in the product. In one embodiment, the second solvent is different from the solvent present in the contacting step, and the second solvent is chosen to be compatible with the solvent of the contacting step to avoid formation of two solvent phases.

Alternatively, the polyacrylonitrile can be added to the product comprising the polysaccharide ester composition and the solvent from the contacting step and the blend formed in this manner. After the blend comprising polyacrylonitrile and the polysaccharide ester composition is formed, fibers comprising the blend can be spun, for example by methods known in the art. The range of polysaccharide ester composition used in such a blend can range from about 0.1% to about 90% on a dry weight basis and more preferably ranges from about 0.1 to about 20% on a dry weight basis. The desired characteristics of fibers comprising this blend are fiber forming capability and water management.

Non-limiting embodiments of the disclosure herein include:
  1. A process comprising the steps:
    a) contacting an esterifying agent and a polysaccharide in the presence of a first solvent and suitable reaction conditions for a reaction time sufficient to form a product comprising a polysaccharide ester composition, the polysaccharide ester composition comprising a polysaccharide ester having a degree of substitution of about 0.001 to about 3;
    wherein the esterifying agent comprises an acyl halide, a phosphoryl halide, a carboxylic acid anhydride, a haloformic acid ester, a carbonic acid ester, or a vinyl ester; and
    the ratio of esterifying agent to polysaccharide is in the range of about 0.001:1 to about 3:1 on a molar equivalent basis;
    b) combining the product obtained in step a) with polyacrylonitrile;
    c) spinning fibers.
  2. The process of embodiment 1, wherein the polyacrylonitrile has a number average molecular weight in the range of from about 20,000 to about 100,000.

3. The process of embodiment 1 or 2, wherein step b) further comprises a step of dissolving or dispersing the polyacrylonitrile in a second solvent.
4. The process of embodiment 3, wherein the second solvent is the same as the first solvent in step a).
5. The process of embodiment 3, wherein the second solvent is different from the first solvent in step a).
6. The process of embodiment 1, 2, 3, 4, or 5, wherein the suitable reaction conditions include a reaction temperature in the range of about 30° C. to about 175° C.
7. The process of embodiment 1, 2, 3, 4, 5, or 6, wherein the suitable reaction conditions include a reaction pressure of about atmospheric pressure, less than atmospheric pressure, or greater than atmospheric pressure.
8. The process of embodiment 1, 2, 3, 4, 5, 6, or 7, wherein the polysaccharide comprises poly alpha-1,3-glucan; poly alpha-1,3-1,6-glucan; water insoluble alpha-(1,3-glucan) polymer having 90% or greater alpha-1,3-glycosidic linkages, less than 1% by weight of alpha-1,3,6-glycosidic branch points, and a number average degree of polymerization in the range of from 55 to 10,000; or dextran.
9. The process of embodiment 1, 2, 3, 4, 5, 6, 7, or 8, wherein the esterifying agent comprises an acyl halide, and the first solvent is selected from dimethylacetamide, tetrahydrofuran, acetonitrile, acetone, methyl ethyl ketone, or a mixture thereof.
10. The process of embodiment 1, 2, 3, 4, 5, 6, 7, 8, or 9, wherein the acyl halide comprises acetyl chloride, benzoyl chloride, propanoyl chloride, hexanoyl chloride, acetyl bromide, benzoyl bromide, propanoyl bromide, acetyl iodide, benzoyl iodide, or propanoyl iodide.
11. The process of embodiment 1, 2, 3, 4, 5, 6, 7, or 8, wherein the esterifying agent is a phosphoryl halide, a carboxylic acid anhydride, a haloformic acid ester, a carbonic acid ester, or a vinyl ester, and the first solvent is selected from dimethylacetamide, dimethylformamide, tetrahydrofuran, acetonitrile, acetone, methyl ethyl ketone, or a mixture thereof.
12. The process of embodiment 1, 2, 3, 4, 5, 6, 7, 8, 9, 10, or 11, wherein the polysaccharide ester composition comprises a polysaccharide ester compound having a degree of substitution of about 0.3 to about 1.5.
13. The process of embodiment 1, 2, 3, 4, 5, 6, 7, 8, 9, 10, 11, or 12, wherein the polysaccharide ester composition comprises a polysaccharide ester compound comprising a $C_2$-$C_{20}$ acyl group.
14. The process of embodiment 1, 2, 3, 4, 5, 6, 7, 8, 9, 10, 11, 12, or 13 wherein the step a) contacting an esterifying agent with a polysaccharide in the presence of a solvent further comprises the steps of:
i) contacting the polysaccharide and the first solvent to form an initial mixture comprising water;
ii) heating the initial mixture;
iii) removing at least a portion of the water from the initial mixture under reduced pressure to obtain a mixture comprising a reduced water content; and
iv) adding the esterifying agent to the mixture comprising a reduced water content.
15. The process of embodiment 1, 2, 3, 4, 5, 6, 7, 8, 9, 10, 11, 12, 13, or 14, further comprising a step of removing at least a portion of the byproduct acid halide formed in the contacting step a).
16. The process of embodiment 1, 2, 3, 4, 5, 6, 7, 8, 9, 10, 11, 12, 13, 14, or 15, wherein the polysaccharide comprises poly alpha-1,3-glucan.
17. The process of embodiment 1, 2, 3, 4, 5, 6, 7, 8, 9, 10, 11, 12, 13, 14, or 15 wherein the polysaccharide comprises poly alpha-1,3-1,6-glucan.
18. The process of embodiment 1, 2, 3, 4, 5, 6, 7, 8, 9, 10, 11, 12, 13, 14, or 15 wherein the polysaccharide comprises water insoluble alpha-(1,3-glucan) polymer having 90% or greater alpha-1,3-glycosidic linkages, less than 1% by weight of alpha-1,3,6-glycosidic branch points, and a number average degree of polymerization in the range of from 55 to 10,000.
19. The process of embodiment 1, 2, 3, 4, 5, 6, 7, 8, 9, 10, 11, 12, 13, 14, or 15, wherein the polysaccharide comprises dextran.
20. Fibers comprising polyacrylonitrile and a polysaccharide ester composition, prepared by the process of embodiment 1, 2, 3, 4, 5, 6, 7, 8, 9, 10, 11, 12, 13, 14, 15, 16, 17, 18, 19, or 20.
21. Fibers prepared by the process of embodiment 1, 2, 3, 4, 5, 6, 7, 8, 9, 10, 11, 12, 13, 14, 15, 16, 17, 18, or 19, wherein the fibers comprise polyacrylonitrile and a polysaccharide ester compound having a degree of substitution of about 0.001 to about 3, wherein at least one ester group of the polysaccharide ester compound comprises a $C_2$-$C_{20}$ acyl group.

Unless otherwise defined, all technical and scientific terms used herein have the same meaning as commonly understood by one of ordinary skill in the art. Although methods and materials similar or equivalent to those described herein can be used in the practice or testing of embodiments of the disclosed compositions, suitable methods and materials are described below. In addition, the materials, methods, and examples are illustrative only and not intended to be limiting.

In the foregoing specification, the concepts have been disclosed with reference to specific embodiments. However, one of ordinary skill in the art appreciates that various modifications and changes can be made without departing from the scope of the invention as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all embodiments.

EXAMPLES

Unless defined otherwise herein, all technical and scientific terms used herein have the same meaning as commonly understood by one of ordinary skill in the art to which this disclosure belongs.

The disclosure is further defined in the following Examples. It should be understood that the Examples, while indicating certain embodiments, is given by way of illustration only. From the above discussion and the Examples, one skilled in the art can ascertain essential characteristics of this disclosure, and without departing from the spirit and scope thereof, can make various changes and modifications to adapt to various uses and conditions.

All materials other than polysaccharides were used as received from Aldrich, unless otherwise indicated. Dimethylacetamide (DMAc) was obtained as anhydrous or as reagent grade and distilled in the presence of glucan before reactions.

Dissolved solids of a solution is the weight of polymer dissolved divided by the weight of polymer dissolved plus solvent. For example, a 10 wt % solution would be composed of 10 g polymer/(10 g polymer plus 90 g DMAc).

As the molecular weight of the glucan polymer is increased by functionalization (in situ esterification), the mass of the functional polymer increases. "Functional solids" refers to the solids in the product composition and is based on [mass functional polymer/(solvent+mass functional polymer)]. Gravimetric analysis can be used to determine % functional solids.

Dissolved solids was determined by isolating a known mass of solution by precipitating the solution into a non-solvent for the derivative polymer such as water or methanol, washing the solid polymer that precipitates and drying the polymer. The solids are determined as weight of the polymer divided by weight of the solution.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Two samples of poly alpha-1,3-glucan were used. Glucan #1 was ground dry powder. Glucan #1 was dried for a minimum of 24 hours at 60° C. under vacuum and low nitrogen purge. Glucan #2 was wet cake.

In Situ Preparation of Glucan Acetate

The set-up included a reaction kettle, nitrogen, vacuum, stirring, an optional scrubber. The final solution can be used in a process without isolating the glucan acetate.

Example 1

This example targeted 1 DoS with approximately 10% functional solids.

Glucan #1 powder was weighed (260 g with 90% solids, 1.44 moles) charged with DMAc (2810 g) into a 2 L jacketed reaction kettle equipped with U-shaped Teflon coated motor driven stir, react-IR probe, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 80-85° C. DMAc and water were distilled over until the FTIR probe OH peak was flat and water was removed from the vessel over an hour of distillation. The volume of the liquor overhead was 275 mL. The vessel was cooled to 40° C. in 1 hour and purged with nitrogen. Acetyl chloride (103 mL, 113 g, 1.44 moles) was drawn into a calibrated glass syringe in 2 portions. One portion of 50 mL acetyl chloride was added quickly. The mixture gelled quickly and was agitated for half an hour to a homogenous solution. The $N_2$ purge was acidic at pH 1 from HCl generation. The second portion of 53 mL acetyl chloride was added and stirring was maintained with the temperature at 45° C. for 30 additional minutes. The $N_2$ purge was monitored to reach DMAc pH of 3-4. The reaction mixture was a homogenous clear solution.

A portion of the reaction mixture was isolated into methanol, washed, and dried for analysis. The $^1H$ NMR spectra was obtained in DMSO/LiCl and showed conversion to 0.97 DoS.

Example 2

This example targeted a 0.5 DoS with approximate 10% functional solids. Example 2 was run similarly to Example 1 but without the IR probe and with additions as specified here. Glucan #1 powder was weighed (158 g with 99.8% solids, 0.98 moles) charged with DMAc (1894 g) into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 80-85° C. DMAc and water were distilled. The volume of the liquor overhead was 185 mL. The vessel was cooled to 45° C. in 1 hour and purged with nitrogen. Acetyl chloride (37 mL, 41 g, 0.52 moles) was drawn into a calibrated glass syringe. The acetyl chloride was added over 4 minutes. An exotherm was observed over 7 minutes with an increase in temperature to 51° C. The mixture gelled quickly and was agitated for 25 minutes. The $N_2$ purge was monitored to reach DMAc pH of 3-4. The reaction mixture cleared after stirring at 45° C. for 30 minutes and was cooled after an additional hour of stirring.

Example 3

This example targeted a 1.5 DoS with approximate 10% functional solids. This example was run similarly to Example 1 but without the IR probe and with additions as specified here. Glucan #1 powder was weighed (253 g with 99.8% solids, 1.56 moles) charged with DMAc (2810 g) into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 80-85° C. DMAc and water were distilled. The volume of the liquor overhead was 275 mL. The vessel was cooled to 45° C. in 2 hours and purged with nitrogen. In portions acetyl chloride was drawn into a calibrated glass syringe. The first 50 mL portion of acetyl chloride was added over 2 minutes. An exotherm was observed over the 2 minutes with an increase in temperature to 48° C. Further addition of acyl chloride resumed with addition of 26 mL, 20 mL and 15 mL over 8 minutes with a temperature rise of 6° C. Further addition of acyl chloride resumed with 56 mL over 5 minutes. The $N_2$ purge was monitored to reach DMAc pH of 3-4. The reaction mixture cleared and was cooled after an additional hour of stirring.

Example 4

This example targeted a DoS of 1 with approximate 10% functional solids. This example was run similarly to Example 2, using a rotor stator to disperse the powder in DMAc, and additions as specified here. In a beaker Glucan #1 powder was weighed (185 g with 99.8% solids, 1.14 moles), mixed with DMAc (2000 g) and rotor-statured to a dispersion. The dispersion was charged into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 80-85° C. DMAc and water were distilled. The volume of the liquor overhead was 200 mL. The vessel was cooled to 45° C. in 1 hour and purged with nitrogen. Acetyl chloride (40.5 mL, 45 g, 0.56 moles) was drawn into a calibrated glass syringe. The acetyl chloride was added quickly under a minute. A second portion of acetyl chloride (40.5 mL, 45 g, 0.56 moles) was drawn into a calibrated glass syringe and added under a minute. The mixture gelled and an exotherm was observed over 2 minutes with an increase in temperature to 56° C. The $N_2$ purge was monitored to reach DMAc pH of 3-4. The reaction mixture was mixed at 45° C. for 30 minutes to a homogenous clear solution.

Example 5

This example targeted a DoS of 1 with approximate 10% functional solids. This example was run using Glucan #2 wet-cake washed with three half liter aliquots of acetone. The washed Glucan #2 (70 g dry basis, 0.43 moles) was then mixed with 900 g DMAc and was rotor-statored in a beaker for a minute. The Glucan #2 mixture was added to the 2 L jacketed reactor and assembly of the reactor was completed with U-shaped Teflon coated motor driven stir, nitrogen inlet, thermocouple, vigreux condenser connected to second condenser with collection funnel and vacuum with valves to change vacuum/nitrogen flow. The dispersion was heated to 86° C. Vacuum of 28 inches Hg was applied and dropped the temperature to 80° C. Distillation of DMAc and acetone was completed in 10 minutes. The volume of the liquor overhead was 90 mL. The vessel was cooled to 45° C. in 1 hour and purged with nitrogen. Acetyl chloride (20 mL, 0.28 moles) was added by syringe in under a minute. The exotherm was monitored and temperature increased by 5° C. The viscosity increased instantly. Heating was maintained and set to 50° C. Some gels remained after 20 minutes of stirring. A second portion of acetyl chloride (20 mL, 0.28 moles) was added by syringe in under a minute. The exotherm was monitored and temperature increased by 5° C. After 3 minutes, the viscosity dropped and the appearance of the solution was clear. The $N_2$ purge was monitored to reach DMAc pH of 3-4 over 2 hours from the first acetyl chloride addition. The solution was stirred under reduced pressure to degas the solution.

A portion of the solution was isolated and solids were found to be 11.6 wt %.

In Situ Preparation of Glucan Benzoate

The set-up included a reaction kettle, nitrogen, vacuum, stirring, an optional scrubber. The final solution can be used in a process without isolating the glucan benzoate.

Example 6

This example targeted a DoS of 1 with approximate 10% functional solids. This example was run similarly to Example 4, using a rotor stator to disperse the powder in DMAc, and additions as specified here. In a beaker Glucan #1 powder was weighed (73.4 g with 99.8% solids, 0.45 moles), mixed with DMAc (939 g) and rotor statored to a dispersion. The dispersion was charged into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 78° C. DMAc and water were distilled. The volume of the liquor overhead was 100 mL. The vessel was cooled for 18 hours and purged with nitrogen. The vessel was reheated to 88° C. Benzoyl chloride (52.6 mL, 63.7 g, 0.45 moles) was drawn into a calibrated glass syringe. The benzoyl chloride was added quickly under a minute. The mixture gelled after 20 minutes of reaction time and an exotherm was not readily observed. After 5 additional minutes the gelling resulted in the whole mass to stop stirring. After an additional 2 minutes the reaction appeared to lower in viscosity and clear. For a total time of 1 hour, the reaction was complete. The $N_2$ purge was monitored to reach DMAc pH of 3-4. Vacuum was applied to the reaction but nothing distilled over.

A portion of the solution was isolated and solids were found to be 9.9 wt %. By mass balance the DoS was observed to be 0.74 DoS.

Example 7

This example targeted a DoS of 1 with approximate 10% functional solids. This example was run similarly to Example 6, using a rotor stator to disperse the powder in DMAc, and additions as specified here. In a beaker Glucan #1 powder was weighed (73.4 g with 99.8% solids, 0.45 moles), mixed with DMAc (939 g) and rotor statored to a dispersion. The dispersion was charged into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 93° C. DMAc and water were distilled. The volume of the liquor overhead was 100 mL. The vessel was cooled for 20 minutes to 95° C. and purged with nitrogen. Benzoyl chloride (52.6 mL, 63.7 g, 0.45 moles) was drawn into a calibrated glass syringe. The benzoyl chloride was added quickly under a minute. The mixture gelled after 20 minutes of reaction time and an exotherm was not readily observed. After 30 additional minutes, the reaction appeared to lower in viscosity and clear. The $N_2$ purge was monitored to reach DMAc pH of 3-4. Vacuum was applied to the reaction but nothing distilled over. A 55 mL sample of solution was isolated and sampled for solids. Solids were found to be 9.3 wt %. The remaining solution was stirred at 55° C. for 18 hours and solids were found to be 9.9 wt %.

Example 8

This example targeted DoS 0.5 with approximate 20% functional solids. This example was run similarly to Example 6 but with no rotor stator, and additions as specified here. The Glucan #1 powder was weighed (72 g with 99.8% solids, 0.44 moles) and mixed with DMAc (460 g) into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 76° C. DMAc and water were distilled. The volume of the liquor overhead was 50 mL. The vessel was equilibrated for 20 minutes to 95° C. and purged with nitrogen. Benzoyl chloride (26 mL, 31.2 g, 0.22 moles) was drawn into a calibrated glass syringe. The benzoyl chloride was added quickly under a minute. The mixture gelled after 6 minutes of reaction time and an exotherm was not readily observed. After 10 additional minutes, the reaction remained highly viscous. After a total of an hour of mixing, the reaction appeared to decrease in viscosity and clear with time. The $N_2$ purge was monitored to reach DMAc pH of 3-4. The solution was clear and was poured from the reactor.

Example 9

This example targeted DoS 0.5 with approximate 10% functional solids. This example was run similarly to Example 8 but with no rotor stator, and additions as specified here. The Glucan #1 powder was weighed (36 g with 99.8% solids, 0.22 moles) and mixed with DMAc (460 g) into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 28-29 inches Hg and the temperature equilibrated to 84° C. DMAc and water were distilled. The volume of the liquor overhead was 65 mL. The vessel was equilibrated for 30 minutes to 90° C. and purged with nitrogen. Benzoyl chloride (15 mL, 18 g, 0.13 moles) was drawn into a calibrated glass syringe. The benzoyl chloride was added quickly under a minute. The mixture gelled after an hour of mixing and an exotherm was not readily observed. After an additional hour of mixing, the reaction appeared to decrease in viscosity and clear with time. The $N_2$ purge was monitored to reach DMAc pH of 3-4. The solution was clear and poured from the reactor.

Example 10

This example targeted DoS 0.75 with approximate 8% functional solids. This example was run similarly to Example 9 but with no rotor stator, and additions as specified here. The Glucan #1 powder was weighed (73.4 g with 99.8% solids, 0.44 moles) and mixed with DMAc (937 g) into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 28-29 inches Hg and the temperature equilibrated to 82° C. DMAc and water were distilled. The volume of the liquor overhead was 100 mL. The vessel was equilibrated for 45 minutes to 90° C. and purged with nitrogen. Benzoyl chloride (26.3 mL, 31.6 g, 0.22 moles) was drawn into a calibrated glass syringe. The benzoyl chloride was added quickly under a minute. The mixture gelled after 40 minutes of mixing and an exotherm was not readily observed. After an additional 30 minutes of mixing, the reaction mixture appeared to decrease in viscosity and remained slightly cloudy. An additional charge of benzoyl chloride (13 mL, 16 g, 0.11 moles) was added. The $N_2$ purge was monitored to reach DMAc pH of 3-4. The solution was clear and poured from the reactor. A portion was isolated and solids were found to be 6.1 wt %.

In Situ Preparation of Glucan Propionate

Example 11

This example targeted DoS 1 with approximate 10% functional solids. This example was run similarly to Example 7, using a rotor stator to disperse the powder in DMAc, and additions as specified here. In a beaker Glucan #1 powder was weighed (73.4 g with 99.8% solids, 0.45 moles), mixed with DMAc (939 g) and rotor statored to a dispersion. The dispersion was charged into a 2 L jacketed reaction kettle equipped with U-shaped Teflon coated motor driven stir, nitrogen inlet, thermocouple, vigreux condenser connected to second condenser with collection funnel and vacuum with valves to change vacuum/nitrogen flow. The vessel was heated to 100° C. over an hour. Vacuum was slowly applied to 27-29 inches Hg and the temperature equilibrated to 88° C. DMAc and water were distilled. The volume of the liquor overhead was 105 mL. The vessel was cooled for 36 minutes to 65° C. and purged with nitrogen. Propionyl chloride (40.3 mL, 42.7 g, 0.46 moles) was drawn into a calibrated glass syringe. The propionyl chloride was added quickly under a minute. The mixture showed an increase in viscosity in 4 minutes and exotherm of 8° C. The reaction mixture cleared with an additional 2 minutes of stirring. The $N_2$ purge was monitored to reach DMAc pH of 3-4. Vacuum was applied to the reaction but nothing distilled over. A 35 g sample of solution was isolated into methanol and washed. Solids were found to be 10.2% solids.

In Situ Preparation of Glucan Laurate

Example 12

This example reached a DoS of 1.2 and approximately 15% functional solids. In a 250 mL 3 neck flask with stir bar, nitrogen purge, condenser, glucan (5 g, 99.8% solids, 0.030 moles) was added, then DMAc was added. The glucan/DMAc was heated to 100° C. Upon cooling to 60° C. lauryl chloride (15.8 g, 14.3 mL, 0.065 moles) was added via an addition funnel. After 10 minutes of stirring the reaction began to gel to a honey like consistency. With 10 additional minutes, the gel began to re-disperse to lower viscosity. After 3 additional hours the polymer was isolated as 12.7 g white fluffy powder. NMR in $CDCl_3$ showed conversion to 1.2 DoS.

Example 13

This example reached a DoS of 0.5 and approximately 10% functional solids. In a 250 mL 3 neck flask with stir bar, nitrogen purge, condenser, glucan (5 g, 99.8% solids, 0.031 moles) was added, then DMAc was added. The glucan/DMAc was heated to 100° C. Upon cooling to 60° C. lauryl chloride (6.75 g, 7.13 mL, 0.031 moles) was added via an addition funnel. After 5 minutes of stirring the reaction began to gel to a honey like consistency and some graniness. After 3 additional hours the polymer was isolated as 8.35 g white fluffy powder. NMR in DMSO showed conversion to 0.5 DoS.

Example 14

This example targeted a 1 DoS with approximately 10% functional solids. In a 2 L 4-port round bottom flask with nitrogen purge vertical condenser and distillation condenser, collection flask and vacuum port, Glucan #1 100.5 g (0.62 moles) and 1118 g DMAc (3126.55 ppm water) were added. Under reduced pressure using an aspirator and controller, water was distilled from the slurry over a period of an hour at 95° C. In the collection flask 30 mL water was collected. The vacuum was removed and the system was equilibrated under nitrogen. The temperature was reduced to 45° C. over 30 additional minutes. When the mixture reached 45° C., acetyl chloride (52.78 g, 48 mL, 0.67 moles) was added over 3 minutes. A temperature rise was observed of 11° C. Viscosity also increased after the addition of the acetyl chloride. After 30 minutes of reaction, the solution was clear. Vacuum was applied for 2 minutes then returned to nitrogen purge for storing until used.

Blends with PAN and Film Formation

Example 15

PAN (Dralon X grade) solution was prepared as follows. In a beaker 9.5 g dry PAN and 35.5 g DMAC were mixed by hand and dissolved in an oven at 80° C. for an hour. To the PAN solution, 5 g of the material prepared in Example 14 was added. The blend was mixed by hand and showed a clear solution. The blend was equilibrated in the oven for an hour.

Example 16

PAN (Dralon X grade) solution was prepared as follows. In a beaker 8.5 g dry PAN and 34 g DMAC were mixed by hand and dissolved in an oven at 80° C. for an hour. To the PAN solution, 15 g of the material prepared in Example 14 was added. The blend was mixed by hand and showed a clear solution. The blend was equilibrated in the oven for an hour.

Films were cast using a doctor blade with the conditions of either solvent evaporation or water coagulation as shown in Table 1 below. The appearance of the films are also noted in Table 1. The Control sample did not contain a polysaccharide ester composition.

TABLE 1

| Sample | Evaporation | Water coagulation |
| --- | --- | --- |
| Control 20% Dralon X | Clear film | Opaque film |
| Example 15 5% | Clear film | Opaque film |
| Example 16 15% | Clear film | Opaque film |

The films are shown in FIG. 1.

Fiber Spinning

Comparative Example A

Fiber spinning of PAN (Dralon X) was done using a 20% Dralon X/DMAc solution prepared in a stirred and heated vessel. Dope was extruded through a 3000 hole spinerette with 40 micron holes running at approximately 20 g/hr per hole into a coagulation bath (bath 1) followed by washing and drawing baths summarized in Table 2.

TABLE 2

| Spinning conditions | | | |
| --- | --- | --- | --- |
| Bath # | T | Speed (m/min) | DMAc % |
| 1 | 10 C. | 2.5 | 55% |
| 2 | 60 C. | 4.2 | 25% |
| 3 | 95 C. | 7 | 15% |
| 4 | 95 C. | 10.1 | 10% |
| 5 | 95 C. | 14.6 | 7% |
| 6 | 95 C. | 17.9 | water |
| 7 | 95 C. | 25 | water/steam |
| 8 | 95 C. | 25 | water |

Example 17 Fiber Blend

In the stirred, heated vessel, the material prepared in Example 14, Dralon X powder and DMAc were added to target a solid fiber composition of the material prepared in Example 14 at 5% and PAN at 95%. The solution was extruded in same conditions as Comparative Example A. Fibers were obtained.

In Situ Preparation of Glucan Acetate

Example 18

To a 3 L jacketed reactor equipped with a U-shaped Teflon coated motor driven stirrer, nitrogen inlet, thermocouple, vigreux column connected to second condenser with collection funnel, and vacuum with valves to change vacuum/nitrogen flow was charged 1130 g DMAc and 56 g of calcium chloride. After the salt was dissolved, 80 g (0.49 moles) of glucan #1 was added under rapid agitation. The contents were held at 65° C. overnight to ensure complete dissolution of the glucan. Vacuum was then slowly applied to 27-29 inches Hg to pull over DMAc and any water present. After 161 g were removed, the pressure was brought back to atmospheric and the reactor was held under a slow nitrogen purge. Using a syringe, 48 mL (0.25 moles) of tripropylamine were added. This was followed immediately by the addition of 93 mL (0.98 moles) of acetic anhydride. The batch temperature was held at 80° C. for 3 hours. The heater was turned off and vacuum was applied to remove DMAc to cool the reactor contents and raise the viscosity of the reactor liquor.

Gravimetric analysis of a sample precipitated into methanol/isopropyl alcohol indicated the presence of 10.4% solids in the final liquor. Dried powder was dissolved in DMSO with 2% w/v LiCl to yield a reduced viscosity of 1.60 dL/g. The $^1$H NMR spectra obtained in DMSO/LiCl indicated an acetate DOS of 0.70. No undissolved particles were seen by microscopic examination in a dope consisting of 10% dried powder in DMF.

Example 19

To a 1 L reactor submerged in a hot oil bath equipped with a Teflon coated motor driven anchor stirrer, nitrogen inlet, thermocouple, vigreux column connected to second condenser with collection funnel, and vacuum with valves to change vacuum/nitrogen flow was charged 500 g DMF followed by 50.8 g (0.31 moles) of glucan #1. The reactor was held under a slow nitrogen purge while the temperature of the contents was raised to 86° C. Using a syringe, 34 mL (0.24 moles) of triethylamine were added. This was followed immediately by the addition of 73 mL (0.77 moles) of acetic anhydride. The batch temperature was held at 85-90° C. for 7 hours. Samples were pulled for microscopic examination to determine the extent of solids dissolution. When clear, the oil bath was lowered away from the reactor to allow the contents to cool. Vacuum was applied briefly to remove unreacted amine and anhydride.

Gravimetric analysis of a sample precipitated into 50/50 v/v methanol/water indicated the presence of 11.7% solids in the final liquor. Dried powder was dissolved in DMSO with 2% w/v LiCl to yield a reduced viscosity of 1.91 dL/g. The $^1$H NMR spectra obtained in DMSO/LiCl indicated an acetate DOS of 2.5. No undissolved particles were seen by microscopic examination of a dope consisting of 10% dried powder in DMF.

Example 20

To a 1 L jacketed reactor equipped with a Teflon motor driven half-moon shaped stirrer, nitrogen inlet, react-IR probe, thermocouple, short-path column condenser with collection flask and sparging aspiration flask, and vacuum with valves to change vacuum/nitrogen flow was charged 490 g DMF followed by 15 g (0.09 moles) of glucan #1. The reactor was held under a slow nitrogen purge while the temperature of the contents was raised to 90° C. Using a syringe, 1.2 mL (0.008 moles) of 1,8-Diazabicyclo[5.4.0] undec-7-ene were added. This was followed immediately by the addition of 29.6 mL (0.32 moles) of vinyl acetate. The batch temperature was held at 90° C. for 1 hour while monitoring the progress of the reaction by react-IR. When the product ester peak at 1742 cm$^{-1}$ leveled and reactor contents were clear, the contents were cooled by applying cooling to the jacket.

For analysis, a sample was precipitated into water, washed several times with water, then methanol. The $^1$H NMR spectra obtained in DMSO/LiCl indicated an acetate DOS of 1.9.

Example 21

To a 1 L jacketed reactor equipped with a Teflon motor driven half-moon shaped stirrer, nitrogen inlet, react-IR probe, thermocouple, short-path column condenser with collection flask and sparging aspiration flask, and vacuum with valves to change vacuum/nitrogen flow was charged 490 g DMF followed by 40 g (0.25 moles) of glucan #1. The reactor was held under a slow nitrogen purge while the temperature of the contents was raised to 90° C. Using a syringe, 3.7 mL (0.025 moles) of 1,8-Diazabicyclo[5.4.0] undec-7-ene were added. This was followed immediately by the addition of 45.5 mL (0.49 moles) of vinyl acetate. The batch temperature was held at 90° C. for 1 hour while monitoring the progress of the reaction by react-IR. When the product ester peak at 1742 cm$^{-1}$ leveled and reactor contents were clear, the contents were cooled by applying cooling to the jacket.

For analysis, a sample was precipitated into water, washed several times with water, then methanol. The $^1$H NMR spectra obtained in DMSO/LiCl indicated an acetate DOS of 1.9.

Example 22

To a 1 L jacketed reactor equipped with a Teflon motor driven half-moon shaped stirrer, nitrogen inlet, react-IR probe, thermocouple, short-path column condenser with collection flask and sparging aspiration flask, and vacuum with valves to change vacuum/nitrogen flow was charged 490 g DMF followed by 40 g (0.25 moles) of glucan #1. The reactor was held under a slow nitrogen purge while the temperature of the contents was raised to 90° C. Using a syringe, 3.7 mL (0.025 moles) of 1,8-Diazabicyclo[5.4.0] undec-7-ene were added. This was followed immediately by the addition of 22.75 mL (0.25 moles) of vinyl acetate. The batch temperature was held at 90° C. for 1 hour while monitoring the progress of the reaction by react-IR. When the product ester peak at 1742 cm$^{-1}$ leveled and reactor contents were clear, the contents were cooled by applying cooling to the jacket.

For analysis, a sample was precipitated into water, washed several times with water, then methanol. The $^1$H NMR spectra obtained in DMSO/LiCl indicated an acetate DOS of 0.6.

Example 23

To a 1 L jacketed reactor equipped with a Teflon motor driven half-moon shaped stirrer, nitrogen inlet, react-IR probe, thermocouple, short-path column condenser with collection flask and sparging aspiration flask, and vacuum with valves to change vacuum/nitrogen flow was charged 490 g DMF followed by 40 g (0.25 moles) of glucan #1. The reactor was held under a slow nitrogen purge while the temperature of the contents was raised to 90° C. Using a syringe, 0.92 mL (0.006 moles) of 1,8-Diazabicyclo[5.4.0] undec-7-ene were added. This was followed immediately by the addition of 45.5 mL (0.49 moles) of vinyl acetate. The batch temperature was held at 90° C. for 1 hour while monitoring the progress of the reaction by react-IR. When the product ester peak at 1742 cm$^{-1}$ leveled and reactor contents were clear, the contents were cooled by applying cooling to the jacket.

For analysis, a sample was precipitated into water, washed several times with water, then methanol. The $^1$H NMR spectra obtained in DMSO/LiCl indicated an acetate DOS of 1.8.

In Situ Preparation of Glucan Benzoate

Example 24

To a 3 L jacketed reactor equipped with a U-shaped Teflon coated motor driven stirrer, nitrogen inlet, thermocouple, vigreux column connected to second condenser with collection funnel, and vacuum with valves to change vacuum/ nitrogen flow was charged 1130 g DMAc and 56 g of calcium chloride. After the salt was dissolved, 80 g (0.49 moles) of glucan #1 was added under rapid agitation. The contents were held at 65° C. overnight to ensure complete dissolution of the glucan. Vacuum was then slowly applied to 27-29 inches Hg to pull over DMAc and any water present. After 151 g were removed, the pressure was brought back to atmospheric and the reactor was held under a slow nitrogen purge. Using a syringe, 48 mL (0.25 moles) of tripropylamine were added. This was followed immediately by the addition of 222 g (0.98 moles) of benzoic anhydride dissolved in 100 g of DMAc. The batch temperature was held at 80° C. for 7 hours. The heater was turned off and vacuum was applied to remove DMAc to cool the reactor contents and raise the viscosity of the reactor liquor. A total of 218 g of liquid was removed.

Gravimetric analysis of a sample precipitated into water followed by 3 methanol washes indicated the presence of 9.0% solids in the final liquor. Dried powder was dissolved in DMSO with 2% w/v LiCl to yield a reduced viscosity of 1.58 dL/g. The $^1$H NMR spectra obtained in DMSO/LiCl indicated a benzoate DOS of 0.76. No undissolved particles were seen by microscopic examination in a dope consisting of 10% dried powder in DMF.

Example 25

To a 1 L jacketed reactor equipped with a Teflon motor driven half-moon shaped stirrer, nitrogen inlet, react-IR probe, thermocouple, short-path column condenser with collection flask and sparging aspiration flask, and vacuum with valves to change vacuum/nitrogen flow was charged 490 g DMF followed by 15 g (0.09 moles) of glucan #1. The reactor was held under a slow nitrogen purge while the temperature of the contents was raised to 90° C. Using a syringe, 1.2 mL (0.008 moles) of 1,8-Diazabicyclo[5.4.0]undec-7-ene were added. This was followed immediately by the addition of 44.4 mL (0.32 moles) of vinyl benzoate. The batch temperature was held at 90° C. for 1 hour while monitoring the progress of the reaction by react-IR. When the product ester peak at 1742 cm$^{-1}$ leveled and reactor contents were clear, the contents were cooled by applying cooling to the jacket.

For analysis, a sample was precipitated into water, washed several time with water, then methanol. The $^1$H NMR spectra obtained in DMSO/LiCl indicated an acetate DOS of 1.2.

What is claimed is:

1. A process comprising:
   (a) contacting an esterifying agent and a polysaccharide in the presence of a solvent in a reaction to form a polysaccharide ester product in a polysaccharide ester composition,
      wherein the polysaccharide comprises poly alpha-1,3-glucan, wherein at least 50% of the glycosidic linkages of the poly alpha-1,3-glucan are alpha-1,3 glycosidic linkages,
      wherein the polysaccharide ester product has a degree of substitution of about 0.001 to about 3.0,
      wherein the polysaccharide ester product is not isolated from the polysaccharide ester composition,
      wherein the esterifying agent comprises an acyl halide, phosphoryl halide, carboxylic acid anhydride, haloformic acid ester, carbonic acid ester, or vinyl ester, and
      wherein the ratio of esterifying agent to the polysaccharide is about 0.001:1 to about 3:1 on a molar equivalent basis;
   (b) combining the polysaccharide ester composition obtained in step (a) with a polymer to form a blend; and
   (c) spinning fibers with the blend.

2. The process of claim 1, wherein at least 90% of the glycosidic linkages of the poly alpha-1,3-glucan are alpha-1,3 glycosidic linkages.

3. The process of claim 2, wherein at least 99% of the glycosidic linkages of the poly alpha-1,3-glucan are alpha-1,3 glycosidic linkages.

4. The process of claim 1, wherein the polysaccharide ester product has a degree of substitution of about 0.3 to about 1.5.

5. The process of claim 1, wherein the polysaccharide ester product comprises a $C_2$-$C_{20}$ acyl group.

6. The process of claim 5, wherein the $C_2$-$C_{20}$ acyl group is a benzoyl group.

7. The process of claim 1, wherein the esterifying agent comprises the acyl halide, and the solvent is selected from dimethylacetamide, tetrahydrofuran, acetonitrile, acetone, methyl ethyl ketone, or a mixture thereof.

8. The process of claim 7, wherein the acyl halide comprises acetyl chloride, benzoyl chloride, propanoyl chloride, hexanoyl chloride, acetyl bromide, benzoyl bromide, propanoyl bromide, acetyl iodide, benzoyl iodide, or propanoyl iodide.

9. The process of claim 1, wherein the polysaccharide ester composition is a solution.

10. The process of claim 1, wherein the polysaccharide ester composition comprises by-products of the reaction, salts, and/or excess esterifying agent.

11. Fibers prepared by the process of claim 1.

12. The fibers of claim 11, wherein the polysaccharide ester product comprises a $C_2$-$C_{20}$ acyl group.

13. The fibers of claim 12, wherein the $C_2$-$C_{20}$ acyl group is a benzoyl group.

* * * * *